(12) United States Patent
Kim et al.

(10) Patent No.: US 8,877,287 B2
(45) Date of Patent: Nov. 4, 2014

(54) METHOD FOR MANUFACTURING ANTI-REFLECTIVE COATING FILM

(71) Applicant: LG Chem, Ltd., Seoul (KR)

(72) Inventors: Heon Kim, Daejeon (KR); Yeong-Rae Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/843,008

(22) Filed: Mar. 15, 2013

(65) Prior Publication Data

US 2013/0216729 A1 Aug. 22, 2013

Related U.S. Application Data

(63) Continuation of application No. PCT/KR2012/004765, filed on Jun. 15, 2012.

(30) Foreign Application Priority Data

Aug. 26, 2011 (KR) .................. 10-2011-0085787
Aug. 26, 2011 (KR) .................. 10-2011-0085788
Apr. 6, 2012 (KR) .................. 10-2012-0036336

(51) Int. Cl.
| | | |
|---|---|---|
| B05D 1/12 | (2006.01) | |
| B05D 5/06 | (2006.01) | |
| B05D 3/06 | (2006.01) | |
| B32B 27/14 | (2006.01) | |
| B32B 7/02 | (2006.01) | |
| G02B 1/11 | (2006.01) | |
| G02B 5/02 | (2006.01) | |
| G02B 1/10 | (2006.01) | |
| C08J 5/18 | (2006.01) | |
| C08J 7/04 | (2006.01) | |

(52) U.S. Cl.
CPC ............... *G02B 1/11* (2013.01); *G02B 5/247* (2013.01)*B32B 27/14* (2013.01); *B32B 7/02* (2013.01); ;
*B05D 5/063* (2013.01); *G02B 1/111* (2013.01); *G02B 5/0236* (2013.01); *G02B 1/105* (2013.01); *C08J 5/18* (2013.01); *G02B 1/115* (2013.01); *C08J 2301/12* (2013.01); *C08J 7/042* (2013.01); *B05D 3/067* (2013.01)
USPC ........... 427/180; 427/162; 427/164; 427/165; 427/558

(58) Field of Classification Search
CPC .......... B05D 5/06; G02B 1/11; G02B 5/0242; B32B 27/308
USPC .......................... 427/180, 558, 162, 164, 165
See application file for complete search history.

(56) References Cited

U.S. PATENT DOCUMENTS

2008/0221290 A1* 9/2008 Horio ............................. 526/302
2009/0075074 A1* 3/2009 Horio et al. ................... 428/341
(Continued)

FOREIGN PATENT DOCUMENTS

| JP | 2006106714 A | 4/2006 |
| JP | 2006-308832 A | 11/2006 |

(Continued)

OTHER PUBLICATIONS

Heraeus Noblelight Fusion UV Inc., What is UV Curing?, Feb. 12, 2009.*

(Continued)

*Primary Examiner* — Timothy Meeks
*Assistant Examiner* — Ann Disarro
(74) *Attorney, Agent, or Firm* — Rothwell, Figg, Ernst & Manbeck, P.C.

(57) ABSTRACT

The present invention relates to a method for manufacturing an anti-reflective coating film. The method for manufacturing an anti-reflective coating film is used to form an anti-reflective coating film exhibiting more improved interface adhesion and scratch resistance and excellent anti-reflective effect by a simple process.

16 Claims, 6 Drawing Sheets

(56) References Cited

U.S. PATENT DOCUMENTS

| | | |
|---|---|---|
| 2010/0265580 A1 | 10/2010 | Yun et al. |
| 2013/0215514 A1 | 8/2013 | Kim et al. |
| 2013/0216819 A1 | 8/2013 | Kim et al. |
| 2013/0222915 A1 | 8/2013 | Kim et al. |

FOREIGN PATENT DOCUMENTS

| | | |
|---|---|---|
| JP | 2007-121993 A | 5/2007 |
| JP | 2007-133236 A | 5/2007 |
| JP | 2009053691 A | 3/2009 |
| JP | 2009086360 A | 4/2009 |
| JP | 2009151270 A | 7/2009 |
| JP | 2010195901 A | 9/2010 |
| JP | 2011133862 A | 7/2011 |
| KR | 1020040073627 A | 8/2004 |
| KR | 10-2007-0064601 A | 6/2007 |
| KR | 1020070065858 A | 6/2007 |
| KR | 10-2009-0049518 A | 5/2009 |
| KR | 10-2009-0049558 A | 5/2009 |
| KR | 1020100058495 A | 6/2010 |
| TW | 200813172 A | 3/2008 |

OTHER PUBLICATIONS

Fuji Silysia Chemical Ltd., Sylysia—Micronized particles with high porosity, Dec. 14, 2004.*
W. R. Grace & Co., Colloidal Silica, Aug. 26, 2007.*
International Search Report issued in International Appln. No. PCT/KR2012/004765, dated Dec. 26, 2012, 2 pages.

* cited by examiner

METHOD FOR MANUFACTURING ANTI-REFLECTIVE COATING FILM

CROSS REFERENCE TO RELATED APPLICATIONS

This application is a continuation of International Application No. PCT/KR2012/004765, filed Jun. 15, 2012, which claims priority to Korean Patent Application No. 10-2011-0085787 filed on Aug. 26, 2011, and to Korean Patent Application No. 10-2011-0085788 filed on Aug. 26, 2011, and to Korean Patent Application No. 10-2012-0036336 filed on Apr. 6, 2012, each of which are incorporated herein in their entireties.

TECHNICAL FIELD

The present invention relates to a method for manufacturing an anti-reflective coating film.

BACKGROUND OF ART

In general, an anti-reflective film (anti-glare film) is disposed to minimize the reflection of external light on the screen of display devices such as PDP, CRT, and LCD.

The conventional anti-reflective coating film is commonly formed by disposition of an anti-reflective layer on a light-transparent substrate. In this regard, the most widely used anti-reflective layer has a three-layer structure of a hard coat layer and high and low refractive index layers sequentially laminated from the light-transparent substrate. Recently, a two-layer structure omitting the hard coat layer or the high refractive index layer from the anti-reflective layer has been commercialized, in order to simplify the production process. In order to provide anti-glare and scratch-resistant properties, the anti-reflective coating film provided with an anti-glare hard coat layer has been also used.

Meanwhile, the anti-reflective coating film is commonly manufactured by a dry or wet method. Of the methods, the dry method is to laminate a plurality of thin layers using deposition or sputtering. This method offers superior adhesion at a layer interface, but requires high production cost, which is a limitation to commercial use.

In contrast, the wet method is to dry and cure a composition containing a binder, a solvent, etc., after applying it onto a substrate. This method is less expensive than the dry method, and thus widely used in commercial applications. In the wet method, however, compositions required for the formation of the hard coat layer and the high and low refractive index layers should be prepared separately, and each layer is sequentially formed using the composition. Thus, the production process becomes complicated, and offers weak adhesion at a film interface.

For this reason, many studies have been actively made to develop an anti-reflective coating composition capable of forming two or more layers by a single wet coating process. However, there are still many problems that phase separation does not properly occur upon applying the compositions during the production process, and thus individual layers deteriorate in functions.

Further, the hard coat layer or the high refractive index layer is typically formed on the substrate as a pure binder or as a separate layer containing the binder and inorganic nanoparticles, and the hollow particle-dispersed low refractive index layer is formed thereon. However, there are still problems that the anti-reflective coating film having this structure has low durability because of weak adhesion at a layer interface.

DISCLOSURE OF INVENTION

Technical Problem

The present invention provides a method for manufacturing an anti-reflective coating film, which is able to form the anti-reflective coating film showing more improved interface adhesion and scratch resistance by a simplified process.

Technical Solution

According to one embodiment of the present invention, provided is a method for manufacturing an anti-reflective coating film, comprising the steps of:

providing an anti-reflective coating composition comprising a binder composition containing a first (meth)acrylate-based compound and a second (meth)acrylate-based compound having a higher molecular weight than the first (meth)acrylate-based compound, inorganic nanoparticles, hollow particles, an initiator, and a solvent;

applying the composition onto at least one surface of a substrate;

drying the composition to allow at least a part of the first (meth)acrylate-based compound and inorganic nanoparticles to infiltrate into the substrate; and curing the composition to form a first layer that corresponds to the infiltrated region of the substrate, and a second layer comprising hollow particles, which covers the first layer, wherein, a percentage of the cross-sectional area of the hollow particles to any cross-sectional area of the second layer is 70 to 95%.

In the manufacturing method of one embodiment, the anti-reflective coating composition may comprise 5 to 30 parts by weight of the inorganic nanoparticles, 1 to 30 parts by weight of the hollow particles, 5 to 25 parts by weight of the initiator, and 100 to 500 parts by weight of the solvent, based on 100 parts by weight of the binder composition.

Further, the first (meth)acrylate-based compound may have a molecular weight of less than 600, and the second (meth)acrylate-based compound may have a molecular weight of 600 to 100,000. Further, the binder composition may comprise 5 to 30 parts by weight of the second (meth)acrylate-based compound, based on 100 parts by weight of the first (meth)acrylate-based compound.

The first (meth)acrylate-based compound may be one or more compounds selected from the group consisting of pentaerythritol tri(meth)acrylate, pentaerythritol tetra(meth)acrylate, dipentaerythritol hexa(meth)acrylate, trimethylenepropane tri(meth)acrylate, ethylene glycol di(meth)acrylate, 9,9-bis[4-(2-acryloxyethoxy)phenyl]fluorene, bis(4-methacryloxythiophenyl)sulfide, and bis(4-vinylthiophenyl)sulfide, and the second (meth)acrylate-based compound may comprise a compound having two or more molecules of the first (meth)acrylate-based compound linked via a linker. In this regard, the linker may comprise a urethane bond, a thioether bond, an ether bond or an ester bond. In addition, the second (meth)acrylate-based compound may comprise a compound having one or more substituents selected from the group consisting of an epoxy group, a hydroxyl group, a carboxyl group, a thiol group, an aromatic or aliphatic hydrocarbon group having 6 carbon atoms or more, and an isocyanate group.

Further, the binder composition may further comprise a fluorine-based (meth)acrylate compound substituted with one or more fluorine atoms.

In the manufacturing method of one embodiment, the inorganic nanoparticles may have a number average diameter of 5 to 50 nm, and for example, they may be silica nanoparticles.

Further, the hollow particles may have a number average diameter of 5 to 80 nm, and for example, they may be hollow silica particles.

Further, the solvent may have a dielectric constant (25° C.) of 20~30, and a dipole moment of 1.7~2.8.

Advantageous Effects

According to the present invention, two layers in an anti-reflective coating film can be formed by a single coating process, thereby forming the anti-reflective coating film by a more simplified process. Further, the anti-reflective coating film thus formed is able to maintain more improved interface adhesion and scratch resistance and show an excellent anti-reflective effect, and thus it can be preferably used as an anti-reflective coating film in display devices, etc.

REFERENCE NUMERALS

Figure 1:
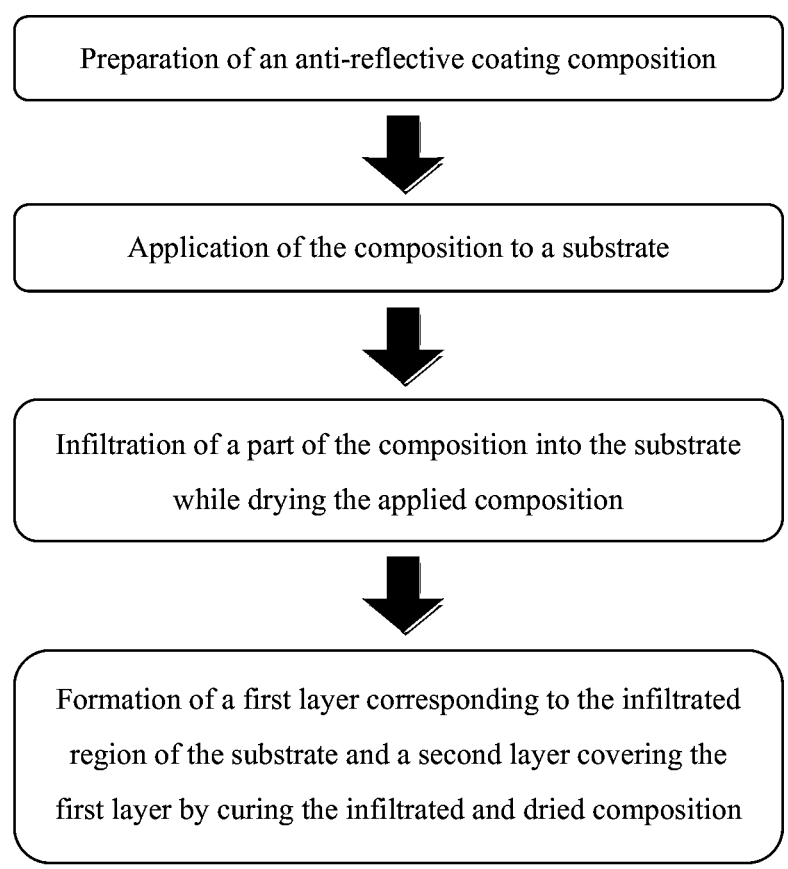
FIG. 1 is a schematic flow chart showing a manufacturing method of an anti-reflective coating film according to one embodiment of the present invention.

1: Substrate
2: First layer (Hard coat layer)
3: Second layer (Low refractive index layer)
4: Hollow particles

BEST MODE FOR CARRYING OUT THE INVENTION

Hereinafter, an anti-reflective coating film and a manufacturing method thereof according to embodiments of the present invention will be described with reference to the accompanying drawings.

In advance, unless otherwise specified throughout the specification, several terms used herein are defined as follows.

First, the term 'inorganic nanoparticle' means a particle made from various inorganic materials, and encompasses particles having a number average diameter in nanometer scale, for example, a number average diameter of 100 nm or less. These inorganic nanoparticles may be amorphous particles having substantially no void therein. For example, 'silica nanoparticles' are particles made from a silicon compound or an organic silicon compound, and means silicon compound particles or organic silicon compound particles having a number average diameter of 100 nm or less and substantially no void therein.

Further, the term 'hollow particle' means an organic or inorganic particle having a void on the surface thereof and/or therein. For example, the term 'hollow silica particle' means a silica particle that is made from a silicon compound or an organic silicon compound and has a void on the surface of and/or inside the silica particle.

Further, the term '(meth)acrylate' is defined to encompass acrylate and methacrylate. The term '(meth)acrylate' may be also defined to have no fluorine-containing substituent, and a compound having the fluorine-containing substituent may be referred to as a fluorine-based (meth)acrylate compound, in order to distinguish from each other.

Further, the term 'coating layer' means a composition layer formed by applying (coating) the anti-reflective coating composition set forth below on a substrate film.

Further, the term 'phase separation' refers to the difference in distribution of a particular component from other components in the composition due to a difference in density, surface tension, or other physical properties of the components. Herein, when phase separation in the coating occurs, at least two layers that can be distinguished are formed according to the distribution difference of a particular component, for example, distribution difference of hollow particles.

Further, the phrase 'infiltrated into the substrate' means that ingredients for forming any layer of the anti-reflective coating film (for example, (meth)acrylate-based compound for forming a binder for the corresponding layer and inorganic nanoparticles, etc) penetrate into the substrate to form the corresponding layer. For example, the ingredients that penetrate into the substrate are dried and cured so as to form a particular layer in the region of the substrate into which they have penetrated. In contrast, the phrase 'a layer is formed on the substrate' means that the ingredients for forming the corresponding layer substantially do not penetrate into the substrate, and they are dried and cured while forming an interface with the substrate, thereby forming a layer on the substrate without an overlapping region with the substrate by penetrating into the substrate.

Further, the phrase 'a layer (e.g., the second layer of one embodiment of the present invention) covers the other layer (e.g., the first layer of that embodiment)' means that there is substantially no distinctive layer between the two layers. For example, in the anti-reflective coating film of one embodiment, 'the second layer containing hollow particles covers the first layer infiltrated into the substrate' means that there is substantially no separate and distinctive layer between the first layer infiltrated into the substrate and the second layer containing hollow particles, for example, substantially no separate layer that has not infiltrated into the substrate and does not comprise hollow particles. For example, in one embodiment, a separate layer that contains only the binder (e.g., crosslinked polymer formed from the (meth)acrylate-based compound) and/or inorganic nanoparticles and that is not infiltrated into the substrate does not exist between the first layer, that is, the infiltration layer and the second layer containing hollow particles.

Meanwhile, the present inventors have studied the anti-reflective coating film. As a result, they found that when the anti-reflective coating film is manufactured while inducing spontaneous phase separation using a certain anti-reflective coating composition, the anti-reflective coating film showing more improved interface adhesion and scratch resistance and an excellent anti-reflective effect can be manufactured by a more simplified process, thereby completing the present invention. These excellent properties of the anti-reflective coating film are likely to be attributed to the specific structure of the anti-reflective coating film obtained by using the specific anti-reflective coating composition and the manufacturing method, in which the anti-reflective coating film comprises the hard coat layer infiltrated into the substrate and the low refractive index layer that is formed to cover the hard coat layer.

According to one embodiment of the present invention, provided is a method for manufacturing the anti-reflective coating film satisfying this specific structure. This method for manufacturing the anti-reflective coating film may comprise the steps of:

forming an anti-reflective coating composition comprising a binder composition comprising the first (meth)acrylate-based compound and the second (meth)acrylate-based compound having a higher molecular weight than the first (meth)acrylate-based compound, inorganic nanoparticles, hollow particles, an initiator, and a solvent;

applying the composition onto at least one surface of the substrate;

drying the composition to allow at least a part of the first (meth)acrylate-based compound and inorganic nanoparticles to infiltrate into the substrate while drying the composition; and curing the composition to form a first layer that corresponds to the infiltrated region of the substrate, and a second layer comprising hollow particles, which covers the first layer.

In the anti-reflective coating film obtained by the manufacturing method, a percentage of the cross-sectional area of the hollow particles to any cross-sectional area of the second layer may be approximately 70 to 95%, or approximately 75 to 93%, or approximately 80 to 90%, or approximately 85 to 92%.

According to the manufacturing method, the solvent of the anti-reflective coating composition may first dissolve a part of the substrate, and subsequently, a part of the binder composition (e.g., parts of the first and second (meth)acrylate-based compounds) and at least a part of the inorganic nanoparticles may infiltrate into the substrate. At this time, the remainder of the binder composition and the inorganic nanoparticles that have not infiltrated, and the hollow particles may form a coating layer on the substrate (e.g., second layer). In particular, this coating layer may remain as a thin layer on the substrate infiltrated with the above components, and the hollow particles may be compactly present inside the coating layer.

Thereafter, when a curing process is performed, the binders of the first and second layers are formed, respectively and the first layer may be formed as an infiltration layer inside the substrate and the second layer containing the hollow particles may be formed to cover the first layer. In the anti-reflective coating film thus manufactured, the first layer may function as a hard coat layer and/or high refractive index layer, and the second layer may function as a low refractive index layer.

As such, according to the manufacturing method of one embodiment, even though a single coating and curing process is applied using a single composition, the anti-reflective coating film can be simply manufactured by infiltration of some components into the substrate and phase separation. Further, the anti-reflective coating film shows excellent interface adhesion and mechanical properties, since the first layer as the hard coat layer has infiltrated into the substrate and formed to be in contact with the second layer. Furthermore, the anti-reflective coating film shows a lower refractive index and excellent anti-reflective property, since a separate layer does not exist between the first and second layers, and hollow particles compactly exist inside the second layer. It is because that the above described anti-reflective coating composition comprises at least two types of (meth)acrylate-based compounds having different molecular weights, and optionally, a solvent having certain physical properties so as to optimize infiltration into the substrate and phase separation.

According to one embodiment, therefore, the anti-reflective coating film having excellent physical properties can be manufactured by a more simplified process.

Hereinafter, each step of the method for manufacturing the anti-reflective coating film of one embodiment will be described. In the manufacturing method of one embodiment, the anti-reflective coating composition is first provided, and subsequent steps are performed. Thus, each component of the anti-reflective coating composition will be first described, and then each step of the manufacturing method will be described.

First (Meth)Acrylate-Based Compound

First, the anti-reflective coating composition may comprise a first (meth)acrylate-based compound. The first (meth)acrylate-based compound may have a molecular weight of less than approximately 600. If the composition is applied to any substrate, at least a part thereof may infiltrate into the substrate.

The first (meth)acrylate-based compound that infiltrates into the substrate is polymerized alone or copolymerized with the second (meth)acrylate-based compound explained below to form a binder of the first layer corresponding to the infiltrated region.

The residual first (meth)acrylate-based compound may remain on the substrate without infiltrating into the substrate. The residual compound is copolymerized with the second (meth)acrylate-based compound to form a binder of the second layer that covers the first layer formed in the infiltrated region of the substrate.

In order to sufficiently infiltrate the first (meth)acrylate-based compound into the substrate and to form the binder of the first layer serving as the hard coat layer in the anti-reflective coating film, the first (meth)acrylate-based compound may have a molecular weight of less than approximately 600, or less than approximately 500, or less than approximately 400, and in another embodiment, it may have a molecular weight of approximately 50 or more, or approximately 100 or more.

In exemplary embodiment, in order to form the first layer that has infiltrated into the substrate and shows higher refractive index (e.g., hard coat layer and/or high refractive index layer), the first (meth)acrylate-based compound may have a substituent such as sulfur, chlorine or metal, or an aromatic substituent.

The first (meth)acrylate-based compound may comprise a compound selected from the group consisting of pentaerythritol tri(meth)acrylate, pentaerythritol tetra(meth)acrylate, dipentaerythritol hexa(meth)acrylate, trimethylenepropane tri(meth)acrylate, ethylene glycol di(meth)acrylate, 9,9-bis [4-(2-acryloxyethoxy)phenyl]fluorene, (refractive index: 1.62), bis(4-methacryloxythiophenyl)sulfide (refractive index: 1.689), and bis(4-vinylthiophenyl)sulfide (refractive index: 1.695), or a mixture of two or more thereof.

Second (Meth)Acrylate-Based Compound

Meanwhile, the anti-reflective coating composition may comprise the second (meth)acrylate-based compound having a higher molecular weight than the first (meth)acrylate-based compound. When the composition comprising this second (meth)acrylate-based compound is applied to any substrate, a relatively smaller amount thereof may infiltrate into the substrate, compared to the above mentioned first (meth)acrylate-based compound, and the rest thereof may remain on the substrate, due to its high molecular weight and bulky chemical structure.

Therefore, the second (meth)acrylate-based compound does not infiltrated into the substrate to a depth equivalent to that of the above mentioned first (meth)acrylate-based compound. As a result, the infiltrated region of the substrate may be divided into the following two regions. First, in the region infiltrated with only the first (meth)acrylate-based compound or in the region at a depth to be infiltrated therewith, a binder formed from a crosslinked polymer of the first (meth)acrylate-based compound may exist. In the other infiltrated region that is infiltrated with the second (meth)acrylate-based compound, the crosslinked copolymer of the second (meth)acrylate-based compound and the first (meth)acrylate-based compound may exist as the binder.

The residual second (meth)acrylate-based compound that does not infiltrate into the substrate may be copolymerized with the above mentioned first (meth)acrylate-based compound to form a binder of the second layer (e.g., low refractive index layer of anti-reflective coating film) covering the first layer that is the infiltration layer inside the substrate. Therefore, interface adhesion between the first layer serving as the hard coat layer of the anti-reflective coating film and the second layer covering thereon (low refractive index layer) is improved, scratch resistance of the low refractive index layer is also improved, and hollow particles in the low refractive index layer are more compactly dispersed.

The second (meth)acrylate-based compound is a compound having a higher molecular weight than the above mentioned first (meth)acrylate-based compound and a bulky structure. For example, it may have a molecular weight of approximately 400 or more, or approximately 500 or more, or approximately 600 or more. For another example, it may have a molecular weight of approximately 100,000 or less, or approximately 80,000 or less, or approximately 50,000 or less.

For the high molecular weight and bulky structure, the second (meth)acrylate-based compound may comprise a compound having a structure of linking two or more molecules of the above mentioned first (meth)acrylate-based compound via a linker. In this regard, the linker may be any chemical bond known to link the (meth)acrylate-based compounds, and for example, a divalent or higher-valent radical comprising a urethane bond, a thioether bond, an ether bond or an ester bond.

For more bulky structure, the second (meth)acrylate-based compound may also have one or more substituents selected from the group consisting of an epoxy group, a hydroxyl group, a carboxyl group, a thiol group, an aromatic or aliphatic hydrocarbon group having 6 carbon atoms or more, and an isocyanate group.

The second (meth)acrylate-based compound may be a commercially available product satisfying the above conditions or directly synthesized. Examples of the commercially available product may comprise UA-306T, UA-306I, UA-306H, UA-510T, UA-510I, and UA-510H (products of KYOEISHA Co.); BPZA-66 and BPZA-100 (products of KYOEISHA Co.); EB9260 and EB9970 (products of BAEYER Co.); and Miramer SP1107 and Miramer SP1114 (products of MIWON Co.).

The above mentioned second (meth)acrylate-based compound may be present in the anti-reflective coating composition in an amount of approximately 5 to 30 parts by weight, or approximately 5 to 25 parts by weight, or approximately 5 to 20 parts by weight, based on 100 parts by weight of the first (meth)acrylate-based compound. The content of the second (meth)acrylate-based compound may be determined, considering optimization of physical properties of the layer or changes in the distribution of hollow particles according to addition of an excessive amount thereof as well as minimal effects achieved by use of the binder compositions comprising the first and second (meth)acrylate-based compounds.

Fluorine-Based (Meth)Acrylate Compound

Meanwhile, the above mentioned anti-reflective coating composition may further comprise the fluorine-based (meth)acrylate compound substituted with one or more fluorine atoms as the binder composition. Owing to the presence of the fluorine-containing substituent, the fluorine-based (meth)acrylate compound does not infiltrated into the substrate when the composition is applied to the substrate. For this reason, the fluorine-based (meth)acrylate compound may form the binder of the second layer that serves as the low refractive index layer of the anti-reflective coating film, together with the above mentioned first and second (meth)acrylate compounds. The fluorine-based (meth)acrylate compound shows a lower refractive index, thereby reducing the refractive index of the low refractive index layer and showing excellent compatibility with the after-mentioned hollow particles due to polar functional groups, and also improving scratch resistance of the low refractive index layer.

The fluorine-based (meth)acrylate compound may have a structure of linking one or more fluorine-containing substituents to any (meth)acrylate compound, and examples of the fluorine-based (meth)acrylate compound may be one or more compounds selected from the group consisting of the compounds of the following Chemical Formulae 1 to 5:

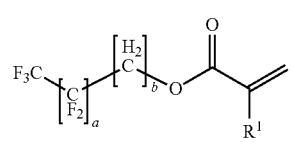

[Chemical Formula 1]

wherein $R^1$ is a hydrogen group or an alkyl group having 1 to 6 carbon atoms, a is an integer of 0 to 7, and b is an integer of 1 to 3;

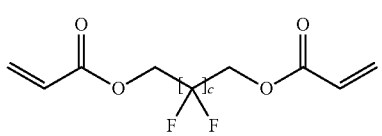

[Chemical Formula 2]

wherein c is an integer of 1 to 10;

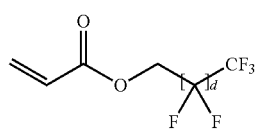

[Chemical Formula 3]

wherein d is an integer of 1 to 11;

[Chemical Formula 4]

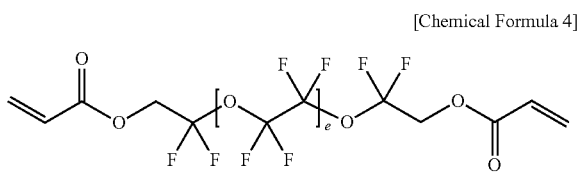

wherein e is an integer of 1 to 5;

[Chemical Formula 5]

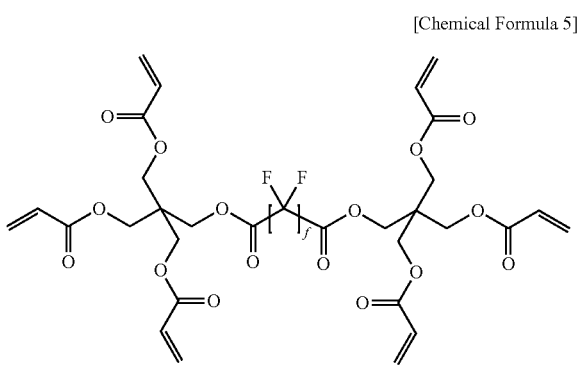

wherein f is an integer of 4 to 10.

Meanwhile, the fluorine-based (meth)acrylate compound may be present in the anti-reflective coating composition in an amount of approximately 0.5 to 20 parts by weight, or approximately 5 to 18 parts by weight, or approximately 10 to 16 parts by weight, based on 100 parts by weight of the above mentioned first (meth)acrylate compound.

The fluorine-based (meth)acrylate compound may be a commercially available product satisfying the above conditions. Examples of the commercially available product may comprise OPTOOL AR110 (manufactured by DAIKIN), LINC-3A and LINC-102A (manufactured by KYOEISHA), PFOA (manufactured by Exfluor), and OP-38Z (manufactured by DIC).

Inorganic Nanoparticles

Meanwhile, inorganic nanoparticles may be comprised in the anti-reflective coating composition.

A part of the inorganic nanoparticles may infiltrate into and be dispersed in the substrate, together with the above mentioned two or more binder compositions, when the composition is applied to a substrate. The remainder thereof that has not infiltrated into the substrate is dispersed in the second layer serving as the low refractive index layer, and contributes to the improvement of scratch resistance and anti-reflective effect.

In one embodiment, the inorganic nanoparticles may be particles that are made from various inorganic materials and have a number average diameter of nanometer scale.

These inorganic nanoparticles may have a number average diameter of, for example, approximately 100 nm or less, or approximately 5 to 50 nm, or approximately 5 to 20 nm. To control transparency, refractive index, and scratch resistance of the coating layer, the diameter of the inorganic nanoparticles should be controlled within the above range.

Further, to obtain improved transparency of the coating layer on the substrate, the silica nanoparticles made from the silicon compound or organic silicon compound may be used as inorganic nanoparticles.

The inorganic nanoparticles may be comprised in the anti-reflective coating composition in an amount of, for example, approximately 5 to 30 parts by weight, or approximately 5 to 25 parts by weight, or approximately 5 to 20 parts by weight, based on 100 parts by weight of the above mentioned first (meth)acrylate-based compound. The content of the inorganic nanoparticles may be controlled within the above range, considering the infiltration content of inorganic nanoparticles according to the type of substrate and a reduction of anti-reflective effect by increased reflectance resulting from addition of an excessive amount thereof as well as the minimal effect of the inorganic nanoparticles.

Meanwhile, the inorganic nanoparticles are dispersed in a dispersion medium, and may be comprised in the form of sol having a solid content of approximately 5 to 40% by weight. Herein, examples of the organic solvent to be used as the dispersion medium may comprise alcohols such as methanol, isopropyl alcohol (IPA), ethylene glycol, and butanol; ketones such as methyl ethyl ketone (MEK) and methyl isobutyl ketone (MIBK); aromatic hydrocarbons such as toluene and xylene; amides such as dimethyl formamide, dimethyl acetamide, and N-methylpyrrolidone; esters such as ethyl acetate, butyl acetate, and γ-butyrolactone; ethers such as tetrahydrofuran and 1,4-dioxane; or mixtures thereof.

According to one embodiment, commercially available silica sol may be used as the inorganic particles, and exemplified by MEK-ST, MIBK-ST, MIBK-SD, MIBK-SD-L, MEK-AC, DMAC-ST, and EG-ST manufactured by Nissan chemical Co.; or Purisol manufactured by Gaematech Co.

Hollow Particles

Meanwhile, hollow particles may be further comprised in the anti-reflective coating composition. These hollow particles mean particles having voids on the surface of and/or inside the particles, and are an ingredient for achieving low refractive index and anti-reflective effect.

These hollow particles, when the composition is applied to the substrate, are substantially not distributed in the first layer that serves as the hard coat layer of the anti-reflective coating film, and they are substantially distributed in the layer covering the first layer, that is, in the second layer serving as the low refractive index layer. Herein, the hollow particles "substantially not distributed (comprised)" in the first layer mean that the content of the hollow particles present in the first layer serving as the infiltration layer in the substrate is less than approximately 5% by weight, or less than approximately 3% by weight, or less than approximately 1% by weight, based on the total weight of the hollow particles.

Meanwhile, a solvent is comprised in the composition of one embodiment, together with the above mentioned binder composition, etc., and therefore, spontaneous phase separation occurs to form the anti-reflective coating film. At this time, when phase separation occurs, the hollow particles are substantially not distributed in the first layer as the infiltration layer due to the difference in the density or in surface energy between the hollow particles and other components, and they are compactly distributed in the second layer serving as the low refractive index layer. As a result, it is possible to form the anti-reflective coating film showing more improved film strength, scratch resistance and anti-reflective property.

The material of these hollow particles is not particularly limited, as long as it is in the form of particles having voids on the surface of and/or inside the particles. In one embodiment, in order to provide the low refractive index layer with transparency and/or low refractive index, hollow silica particles generated from the silicon compound or organic silicon compound may be used.

At this time, the diameter of the hollow particles may be determined within the range of maintaining transparency of the film and showing anti-reflective effect. For example, the hollow particles may have a number average diameter of approximately 5 to 80 nm, or approximately 10 to 75 nm, or approximately 20 to 70 nm.

The hollow particles may be comprised in the anti-reflective coating composition in an amount of approximately 1 to 30 parts by weight, or approximately 1 to 25 parts by weight, or approximately 5 to 20 parts by weight, based on 100 parts by weight of the above mentioned first (meth)acrylate-based compound. In order to achieve their minimal effect of hollow particles and formation of their preferred distribution by phase separation, the content of the hollow particles may be controlled within the above mentioned range.

Further, the hollow particles may be dispersed in a dispersion medium (water or organic solvent), and comprised in the form of colloid having a solid content of approximately 5 to 40% by weight. Herein, examples of the organic solvent to be used as the dispersion medium may comprise alcohols such as methanol, isopropyl alcohol (IPA), ethylene glycol, and butanol; ketones such as methyl ethyl ketone (MEK) and methyl isobutyl ketone (MIBK); aromatic hydrocarbons such as toluene and xylene; amides such as dimethyl formamide, dimethyl acetamide, and N-methylpyrrolidone; esters such as ethyl acetate, butyl acetate, and γ-butyrolactone; ethers such as tetrahydrofuran and 1,4-dioxane; or mixtures thereof.

Solvent

A solvent may be further comprised in the above mentioned anti-reflective coating composition. The solvent functions to control infiltration of the binder compositions into the substrate and the phase separation and distribution pattern of hollow particles as well as the viscosity of the composition within the proper range.

In order to achieve the above effects, the solvent may be a solvent having a dielectric constant (25° C.) of approximately 20 to 30 and a dipole moment of approximately 1.7 to 2.8. Examples of the solvent capable of satisfying these physical properties may comprise methyl ethyl ketone, ethyl acetate, acetyl acetone or the like, and any solvent capable of satisfying the physical properties can be also used. According to one embodiment, other solvent may be also mixed, together with the solvent capable of satisfying the physical properties. Examples of the solvent to be mixed may comprise isobutyl ketone, methanol, ethanol, n-butanol, i-butanol, t-butanol or the like. However, in terms of proper phase separation, it is preferable that the solvent satisfying the range of the dielectric constant and dipole moment is comprised in an amount of approximately 60% by weight or more, based on the total weight of the solvent comprised in the composition.

In the anti-reflective coating composition, the solvent may be comprised in an amount of, for example, approximately 100 to 500 parts by weight, or approximately 100 to 450 parts by weight, or approximately 100 to 400 parts by weight, based on 100 parts by weight of the above mentioned first (meth)acrylate-based compound. If the composition shows bad flowability upon coating, defects such as stripes on the coating layer may be generated. In order to provide the composition with the minimum flowability required, the solvent may be comprised in the predetermined content or more. When an excessive amount of the solvent is added, the solid content becomes too low, and therefore, defects may be generated upon drying and curing, and the distribution of the hollow particles may be deviated from the preferred range.

Initiator

Meanwhile, an initiator may be further comprised in the above mentioned anti-reflective coating composition. The initiator is a compound that is activated by energy ray such as ultraviolet ray so as to induce polymerization of the binder compositions. A compound typically used in the art may be used.

Examples of the initiator may comprise 1-hydroxy cyclohexylphenyl ketone, benzyl dimethyl ketal, hydroxy dimethyl acetophenone, benzoin, benzoin methyl ether, benzoin ethyl ether, benzoin isopropyl ether or benzoin butyl ether, and various other photoinitiators.

At this time, the content of the initiator may be, for example, approximately 5 to 25 parts by weight, or approximately 5 to 20 parts by weight, or approximately 5 to 15 parts by weight, based on 100 parts by weight of the first (meth)acrylate-based compound. For sufficient polymerization of the binder compositions, the initiator may be comprised in the predetermined content or more. When an excessive amount of the initiator is added, each layer constituting the anti-reflective coating film may have the reduced mechanical properties such as scratch resistance or abrasion resistance.

In the manufacturing method of one embodiment, the anti-reflective coating composition comprising the above mentioned components is provided, and then the anti-reflective coating film can be manufactured through the following steps. FIG. 1 is a schematic flow chart showing the manufacturing method of one embodiment, in which the anti-reflective coating film is manufactured using the above mentioned anti-reflective coating composition.

With reference to FIG. 1, the method for manufacturing the anti-reflective coating film comprises the steps of forming the above mentioned anti-reflective coating composition and applying it onto at least one surface of the substrate; drying the composition to allow at least a part of the first (meth)acrylate-based compound and inorganic nanoparticles infiltrates into the substrate; and curing the composition to form the first layer corresponding to the infiltrated region of the substrate, and the second layer that contains hollow particles and covers the first layer.

Through the manufacturing method, the solvent having certain physical properties in the composition may first dissolve a part of the substrate, and subsequently, parts of the first and second (meth)acrylate-based compounds and at least a part of the inorganic nanoparticles may infiltrates into the substrate. At this time, the rests of the first and second (meth)acrylate-based compounds and the inorganic nanoparticles that have not infiltrated, and the hollow particles may form the second layer as the coating layer on the substrate. In particular, this coating layer may remain as a thin layer on the substrate that is infiltrated with the above components, and the hollow particles may compactly exist inside the second layer.

Thereafter, when a curing process is performed, the binder of the first layer containing the crosslinked polymer of the first (meth)acrylate-based compound and the binder of the second layer containing the crosslinked copolymers of the first and second (meth)acrylate-based compounds are formed, respectively and the first layer serving as the hard coat layer may be formed as an infiltration layer inside the substrate and the second layer containing the hollow particles may be formed to cover the first layer. As a result, the anti-reflective coating film can be manufactured.

At this time, the binder of the first layer may further comprise the crosslinked copolymers of the first and second (meth)acrylate-based compounds, together with the crosslinked polymer of the first (meth)acrylate-based compound, owing to the part of the second (meth)acrylate-based compound infiltrated into the substrate. However, the infiltration depth of the second (meth)acrylate-based compound is limited because of its high molecular weight, compared to the first (meth)acrylate-based compound. Thus, the crosslinked copolymers of the first and second (meth)acrylate-based compounds may be comprised only in a part of the first layer, and only the crosslinked polymer of the first (meth)acrylate-based compound may be comprised as the binder in the rest of the region. When the anti-reflective coating composition further comprises the fluorine-based (meth)acrylate compound as the binder composition, the binder of the second layer may comprise the crosslinked copolymers of the first and second (meth)acrylate-based compounds and the fluorine-based (meth)acrylate compound.

As described above, even though a single coating and curing process is applied using a single composition, the anti-reflective coating film can be manufactured by a simple process owing to infiltration of parts of the components into the substrate and phase separation. In this anti-reflective coating film, in particular, the first layer serving as the hard coat layer has infiltrated into the substrate to be in contact with the second layer, thereby showing excellent interface adhesion and mechanical properties. In this anti-reflective coating film, furthermore, a separate layer does not exist between the first and second layers, and hollow particles are compactly present in the second layer, thereby showing lower refractive index and excellent anti-reflective property. In the anti-reflective coating film, in particular, a percentage of the cross-sectional area of the hollow particles to any cross-sectional area of the second layer serving as the low refractive index layer is made to be approximately 70 to 95%, or approximately 75 to 93%, or approximately 80 to 90%, or approximately 85 to 92%, and thus the hollow particles are compactly distributed in the low refractive index layer.

As the above mentioned anti-reflective coating composition comprises at least two types of the (meth)acrylate-based compounds having different molecular weights and the solvent having the predetermined physical properties, infiltration into the substrate and phase separation can be optimized.

In the method for manufacturing the above anti-reflective coating film, the method of applying the composition onto at least one surface of the substrate may be performed using a coating apparatus and method typically used in the art, such as wire bar.

Further, the drying process may be performed at the temperature of approximately 5 to 150° C. for approximately 0.1 to 60 minutes, approximately 20 to 120° C. for approximately 0.1 to 20 minutes, or approximately 30 to 110° C. for approximately 1 to 10 minutes, in order to facilitate phase separation of the composition and infiltration of the composition into the substrate.

Further, in the curing process, polymerization is initiated by applying energy to the dried composition such as photoradiation, thereby curing the infiltrated and dried composition. In the curing process, UV radiation may be performed at approximately 0.1 to 2 $J/cm^2$ for approximately 1 to 600 seconds, or approximately 0.1 to 1.5 $J/cm^2$ for approximately 2 to 200 seconds, or approximately 0.2 to 1 $J/cm^2$ for approximately 3 to 100 seconds, in order to induce sufficient curing reaction.

It is apparent that the method for manufacturing the anti-reflective coating film further comprises the steps typically performed in the art before or after each step, in addition to the above described steps.

Figure 2:
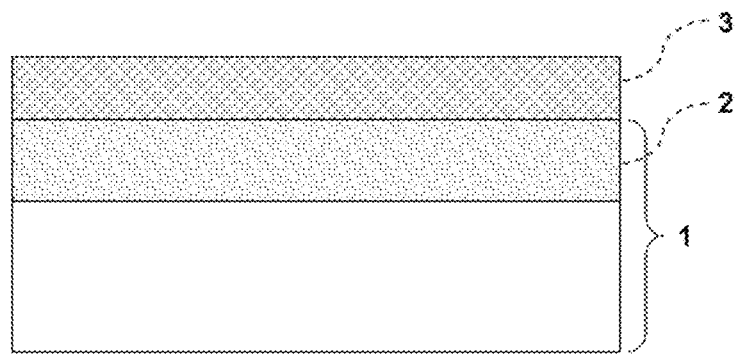
FIG. 2 is a schematic cross-sectional view showing a structure of the anti-reflective coating film manufactured according to one embodiment of the present invention.

Meanwhile, FIG. 2 is a schematic view showing the exemplary anti-reflective coating film manufactured by the manufacturing method of one embodiment. With reference to FIG. 2, in the anti-reflective coating film, the first layer 2 serving as the hard coat layer has infiltrated into the substrate 1, and cured therein, and the second layer 3 serving as the low refractive index layer is formed on the substrate by contacting with and covering the first layer 2 as the infiltration layer. In this regard, there is no separate layer between the first layer 2 that has infiltrated into the substrate and the second layer 3 on the substrate, which means that a separate layer, for example, containing only the binder and/or the inorganic nanoparticles and substantially no hollow particles and without having infiltrated into the substrate does not exist between the first layer as the infiltration layer and the second layer substantially having hollow particles.

As the first layer 2 serving as the hard coat layer has infiltrated into the substrate 1, and the second layer 3 serving as the low refractive index layer is formed to be in contact therewith, the anti-reflective coating film of another embodiment has excellent interface adhesion between the substrate, hard coat layer and low refractive index layer, and therefore, delamination can be minimized during use.

Further, a percentage of the cross-sectional area of the hollow particles to any cross-sectional area of the second layer is made to be approximately 70 to 95%, or approximately 75 to 93%, or approximately 80 to 90%, or approximately 85 to 92%, and thus the hollow particles can be compactly distributed in the second layer serving as the low refractive index layer. Therefore, the anti-reflective coating film exhibits excellent low refractive index property and anti-reflective effect.

Hereinafter, individual layers comprised in the anti-reflective coating film will be described in more detail.

First, the anti-reflective coating film comprises the substrate. As shown in FIG. 2, the substrate 1 is a typical transparent thin film, and any material may be used without limitation, as long as it can be infiltrated with the binder of the first layer and the inorganic nanoparticles. For example, the substrate may be made from polyester-based resins, polycarbonate-based resins, acrylic-based resins, acetate cellulose resins or the like. In one embodiment, a triacetate cellulose (TAC) resin may be used as the substrate in order to improve transparency and anti-reflective effect.

Further, the anti-reflective coating film may comprise the first layer 2 serving as the hard coat layer, which comprises the crosslinked polymer of the first (meth)acrylate-based compound as the binder, and inorganic nanoparticles in the binder. The hard coat layer may infiltrate into the substrate, and function as the high refractive index layer showing a refractive index of approximately 1.5 or more. The first layer 2 may be cured and integrated into the substrate by infiltration of the binder and the inorganic nanoparticles into the substrate. Even though FIG. 2 shows infiltration of the first layer 2 into the entire surface of the substrate 1, the first layer 2 may infiltrate into a part of the substrate 1 in another embodiment.

The second layer 3 serving as the low refractive index layer is formed to be in contact with and cover the first layer 2 that has infiltrated into the substrate 1, and it may be a layer containing hollow particles. More particularly, all or most (e.g., approximately 97% by weight or more, or approximately 99% by weight or more) of the hollow particles are substantially distributed in the second layer, and thus it functions as the low refractive index layer of the anti-reflective coating film. This low refractive index layer shows a low refractive index of approximately 1.45 or less, thereby exhibiting proper anti-reflective effect.

Further, a separate layer that contains only the binder and/or inorganic nanoparticles and that has not infiltrated into the substrate does not exist between the first layer 2 and the second layer 3. As in the case of the known films, a separate layer comprising the binder exists between the hard coat layer and the low refractive index layer results in a disadvantage of reducing adhesion between each layer and the substrate. In contrast, the anti-reflective coating film manufactured according to one embodiment is formed such that the second layer 3 serving as the low refractive index layer is in contact with the substrate 1 and the first layer 2 serving as the hard coat layer, thereby showing more improved interface adhesion, scratch resistance, and anti-reflective effect.

Herein, the binder of the second layer 3 may comprise the crosslinked copolymer of the first and second (meth)acrylate-based compounds. In another embodiment, it may comprise the crosslinked copolymer of the first and second (meth)acrylate-based compounds and the fluorine-based (meth)acrylate compound. As the crosslinked copolymer prepared by further copolymerizing with the fluorine-based (meth)acrylate compound is comprised in the binder of the second layer 3, the second layer 3 serving as the low refractive index layer shows a lower refractive index and excellent anti-reflective effect. In addition, the scratch resistance of the second layer 3 can be more improved.

In addition, the second layer 3 may further comprise the inorganic nanoparticles in the binder, thereby more improving the scratch resistance and anti-reflective effect of the second layer 3.

Meanwhile, the binder of the first layer 2 may further comprise the crosslinked copolymer of the first and second (meth)acrylate-based compounds, in addition to the crosslinked polymer of the above mentioned first (meth)acrylate-based compound.

In this regard, the crosslinked copolymer in the binder of the first layer 2 may be comprised in the certain region of the first layer 2, based on the interface between the first layer 2 and the second layer 3, for example, to approximately 5 to 50% depth, or approximately 5 to 45% depth, or approximately 5 to 40% depth of the first layer 2. The crosslinked copolymer in the binder of the first layer 2 may be comprised to exhibit an increasing distribution gradient toward the second layer 3. Only the crosslinked polymer of the first (meth)acrylate-based compound may be comprised as the binder in the rest of the region in the first layer 2, excluding the crosslinked copolymer-formed region.

As such, the second (meth)acrylate-based compound is crosslinked copolymerized with the first (meth)acrylate-based compound with distribution gradient to the certain depth of the first layer 2, and the crosslinked copolymers are also comprised throughout the second layer 3. Therefore, the interface adhesion between the first layer 2 and the second layer 3 can be more improved, and hollow particles comprised in the second layer 3 can be more compactly distributed.

In the above mentioned anti-reflective coating film, the first layer 2 is a layer having a higher refractive index than the second layer 3 serving as the low refractive index layer, and the refractive index may be approximately 1.5 to 1.58, or approximately 1.5 to 1.57, or approximately 1.51 to 1.56. In addition, the second layer 3 may have a refractive index of approximately 1.1 to 1.45, or approximately 1.15 to 1.43, or approximately 1.2 to 1.42.

In addition, the anti-reflective coating film according to another embodiment has a reflectance of approximately 0.5 to 4%, or approximately 0.8 to 3%, or approximately 1 to 2% to show excellent anti-reflective properties, and thus it can be properly used as the anti-reflective coating film in various display devices such as PDP, CRT or LCD.

Hereinafter, preferred Examples of the present invention will be described for better understanding. However, the following Examples are given for illustrative purposes only, and are not intended to limit the present invention.

Example 1

Preparation of Anti-Reflective Coating Composition

Based on 100 parts by weight of a (meth)acrylate-based compound containing 100 parts by weight of pentaerythritol hexaacrylate (molecular weight: 298.3) and 11.33 parts by weight of acrylate having a urethane functional group (manufactured by KYOEISHA, product name: UA-306T, molecular weight: 1000);

approximately 15.87 parts by weight of silica nanoparticle-dispersed silica sol (dispersion medium: methyl isobutyl ketone and methyl alcohol, solid content: 40% by weight, number average diameter of silica nanoparticles: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photoinitiator (specifically, approximately 1.11 parts by weight of Darocur-1173, approximately 6.48 parts by weight of Irgacure-184, approximately 2.15 parts by weight of Irgacure-819, and approximately 1.11 parts by weight of Irgacure-907); and approximately 251.85 parts by weight of a solvent (specifically, approximately 179.63 parts by weight of methyl ethyl ketone (MEK), approximately 24.07 parts by weight of ethanol, approximately 24.07 parts by weight of n-butyl alcohol and approximately 24.07 parts by weight of acetyl acetone) were mixed to prepare an anti-reflective coating composition.

(Manufacturing of Anti-Reflective Coating Film)

The anti-reflective coating composition was applied to a triacetate cellulose film (thickness of 80 μm) using a wire bar (No. 9). The film was dried in a 90° C. oven for 1 minute, and then UV energy of 200 mJ/cm$^2$ was irradiated thereto for 5 seconds to cure the composition.

Finally, an anti-reflective coating film comprising a hard coat layer formed by infiltration into a substrate and a low refractive index layer covering the hard coat layer was manufactured.

Figure 3:
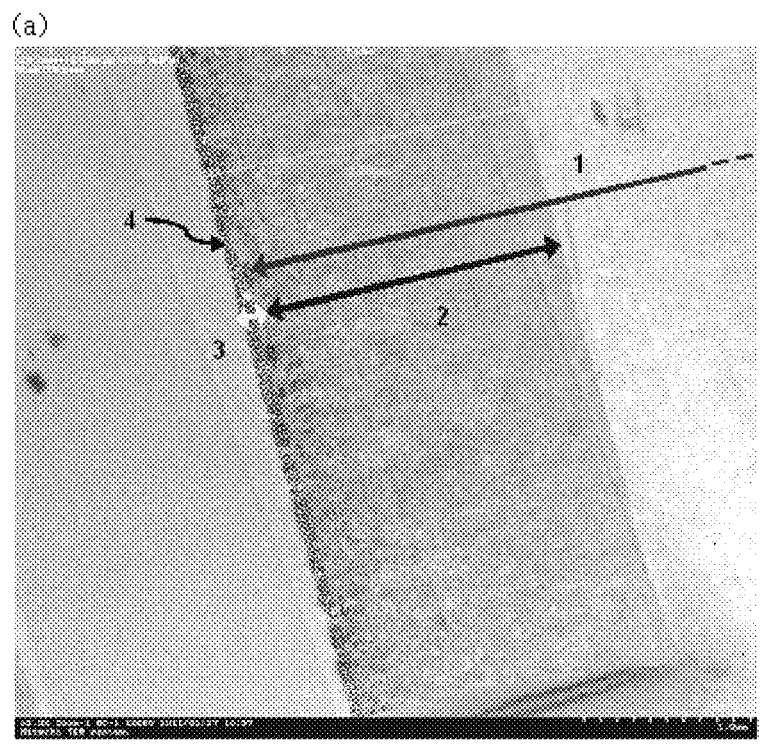
FIGS. 3 to 6 are microscopic images showing the cross-sections of anti-reflective coating films according to Examples 1, 2, and 4 and Comparative Example 1, respectively.
Figure 3:
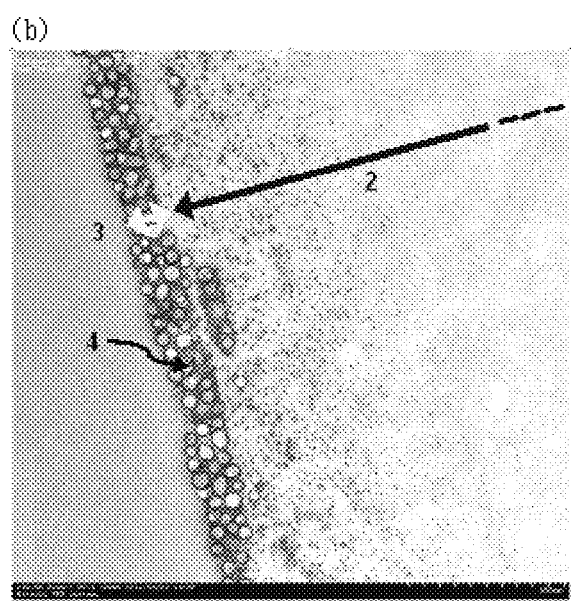

A cross-sectional image of the anti-reflective coating film is shown in FIG. 3(a), and a microscopic image of a part thereof is shown in FIG. 3(b). As shown in FIG. 3, the anti-reflective coating film according to Example 1 was found to have a hard coat layer 2 (approximately 3.9 μm) comprising a binder cured by infiltration into a substrate 1 and inorganic nanoparticles dispersed in the binder; a low refractive index layer 3 (approximately 0.15 μm) comprising a binder cured on the hard coat layer 2 and hollow particles 4 dispersed in the binder.

In addition, there was no separate layer between the hard coat layer 2 and the low refractive index layer 3, and a percentage of the cross-sectional area of the hollow particles 4 to any cross-sectional area of the low refractive index layer 3 was approximately 90%, indicating that hollow particles 4 were very compactly distributed in the low refractive index layer 3.

Example 2

Preparation of Anti-Reflective Coating Composition

Based on 100 parts by weight of a (meth)acrylate-based compound containing 100 parts by weight of pentaerythritol hexaacrylate (molecular weight: 298.3), 11.33 parts by weight of fluorine-based acrylate (product name: OPTOOL AR110, manufactured by DAIKIN, solid content: 15% by weight, methyl isobutyl ketone solvent), and 11.33 parts by weight of acrylate having a urethane functional group (manufactured by KYOEISHA, product name: UA-306T, molecular weight: 1000);

approximately 15.87 parts by weight of silica nanoparticle-dispersed silica sol (dispersion medium: methyl isobutyl ketone and methyl alcohol, solid content: 40% by weight, number average diameter of silica nanoparticles: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photoinitiator (specifically, approximately 1.11 parts by weight of Darocur-1173, approximately 6.48 parts by weight of Irgacure-184, approximately 2.15 parts by weight of Irgacure-819 and approximately 1.11 parts by weight of Irgacure-907); and approximately 251.85 parts by weight of a solvent (specifically, approximately 179.63 parts by weight of methyl ethyl ketone (MEK), approximately 24.07 parts by weight of ethanol, approximately 24.07 parts by weight of n-butyl alcohol and approximately 24.07 parts by weight of acetyl acetone) were mixed to prepare an anti-reflective coating composition.

(Manufacturing of Anti-Reflective Coating Film)

An anti-reflective coating film was manufactured under the same conditions and in the same manner as in Example 1, except using the above anti-reflective coating composition.

Figure 4:
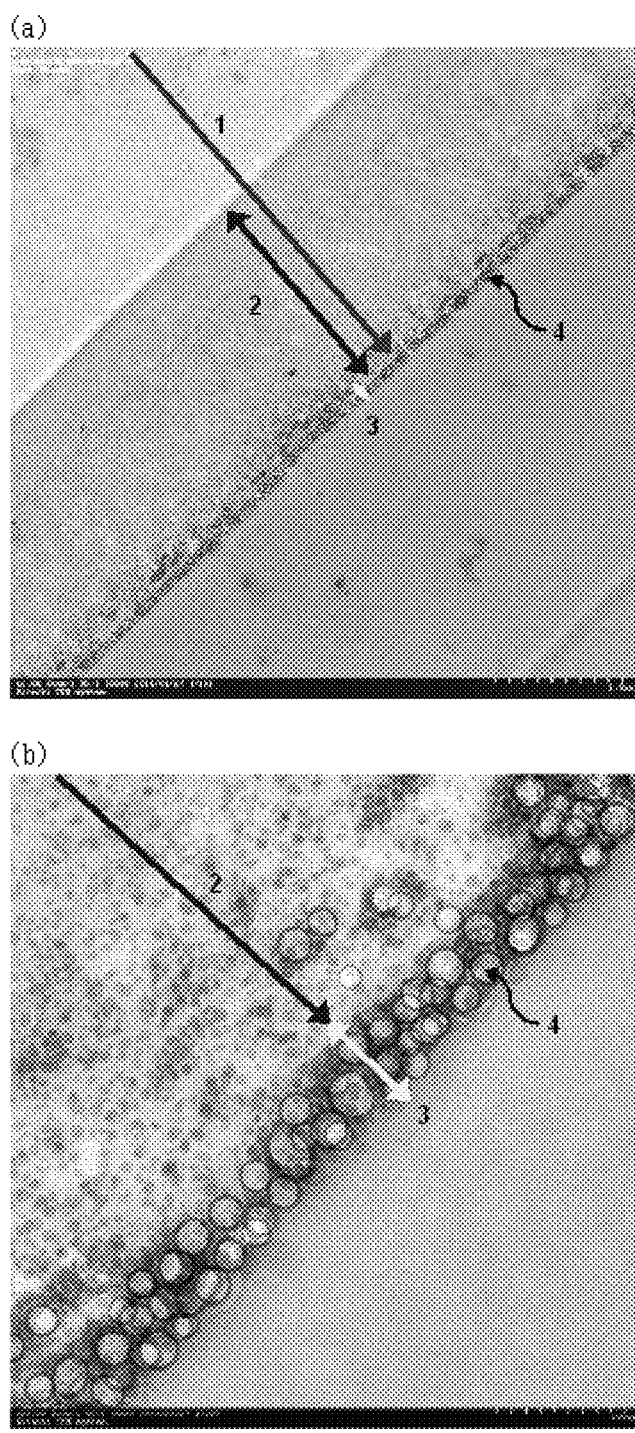

A cross-sectional image of the anti-reflective coating film is shown in FIG. 4(a), and a microscopic image of a part thereof is shown in FIG. 4(b). The anti-reflective coating film according to Example 2 was found to have a hard coat layer 2 (approximately 2.8 μm) comprising a binder cured by infiltration into a substrate 1 and inorganic nanoparticles dispersed in the binder; a low refractive index layer 3 (approximately 0.145 μm) comprising a binder cured on the hard coat layer 2 and hollow particles 4 dispersed in the binder.

In addition, there was no separate layer between the hard coat layer 2 and the low refractive index layer 3, and a percentage of the cross-sectional area of the hollow particles 4 to any cross-sectional area of the low refractive index layer 3 was approximately 90%, indicating that hollow particles 4 were very compactly distributed in the low refractive index layer 3.

In the anti-reflective coating film according to Example 2, in particular, fluorine-based acrylate was comprised in the low refractive index layer, and thus phase separation of the composition effectively occurred, and scratch resistance was also improved.

Example 3

Preparation of Anti-Reflective Coating Composition

Based on 100 parts by weight of a (meth)acrylate-based compound containing 100 parts by weight of pentaerythritol hexaacrylate (molecular weight: 298.3) and 11.33 parts by weight of acrylate having a urethane functional group (manufactured by KYOEISHA, product name: 510H, molecular weight 2000);

approximately 15.87 parts by weight of silica nanoparticle-dispersed silica sol (dispersion medium: methyl isobutyl ketone and methyl alcohol, solid content: 40% by weight, number average diameter of silica nanoparticles: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photoinitiator (specifically, approximately 1.11 parts by weight of Darocur-1173, approximately 6.48 parts by weight of Irgacure-184, approximately 2.15 parts by weight of Irgacure-819 and approximately 1.11 parts by weight of Irgacure-907); and approximately 251.85 parts by weight of a solvent (specifically, approximately 179.63 parts by weight of methyl ethyl ketone (MEK), approximately 24.07 parts by weight of ethanol, approximately 24.07 parts by weight of n-butyl alcohol and approximately 24.07 parts by weight of acetyl acetone) were mixed to prepare an anti-reflective coating composition.

(Manufacturing of Anti-Reflective Coating Film)

The anti-reflective coating composition was applied to a triacetate cellulose film (thickness of 80 μm) using a wire bar (No. 9). The film was dried in a 90° C. oven for 1 minute, and then UV energy of 200 mJ/cm$^2$ was irradiated thereto for 5 seconds to cure the composition.

Finally, an anti-reflective coating film comprising a hard coat layer formed by infiltration into a substrate and a low refractive index layer covering the hard coat layer was manufactured.

A cross-sectional image of the anti-reflective coating film was visualized by SEM. As a result, the anti-reflective coating film according to Example 3 was found to have a hard coat layer (approximately 3.1 μm) comprising a binder cured by infiltration into a substrate and inorganic nanoparticles dispersed in the binder; a low refractive index layer (approximately 0.16 μm) comprising a binder cured on the hard coat layer and hollow particles dispersed in the binder.

In addition, there was no separate layer between the hard coat layer and the low refractive index layer, and a percentage of the cross-sectional area of the hollow particles to any cross-sectional area of the low refractive index layer was approximately 90%, indicating that hollow particles were very compactly distributed in the low refractive index layer.

Example 4

Preparation of Anti-Reflective Coating Composition

Based on 100 parts by weight of a (meth)acrylate-based compound containing 100 parts by weight of pentaerythritol hexaacrylate (molecular weight: 298.3) and 11.33 parts by weight of acrylate having an ester functional group (manufactured by SK Cytec, product name: DPHA, molecular weight: 524);

approximately 15.87 parts by weight of silica nanoparticle-dispersed silica sol (dispersion medium: methyl isobutyl ketone and methyl alcohol, solid content: 40% by weight, number average diameter of silica nanoparticles: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photoinitiator (specifically, approximately 1.11 parts by weight of Darocur- 1173, approximately 6.48 parts by weight of Irgacure-184, approximately 2.15 parts by weight of Irgacure-819 and approximately 1.11 parts by weight of Irgacure-907); and approximately 251.85 parts by weight of a solvent (specifically, approximately 179.63 parts by weight of methyl ethyl ketone (MEK), approximately 24.07 parts by weight of ethanol, approximately 24.07 parts by weight of n-butyl alcohol and approximately 24.07 parts by weight of acetyl acetone) were mixed to prepare an anti-reflective coating composition.

(Manufacturing of Anti-Reflective Coating Film)

The anti-reflective coating composition was applied to a triacetate cellulose film (thickness of 80 μm) using a wire bar (No. 9). The film was dried in a 90° C. oven for 1 minute, and then UV energy of 200 mJ/cm$^2$ was irradiated thereto for 5 seconds to cure the composition.

Finally, an anti-reflective coating film comprising a hard coat layer formed by infiltration into a substrate and a low refractive index layer covering the hard coat layer was manufactured.

Figure 5:
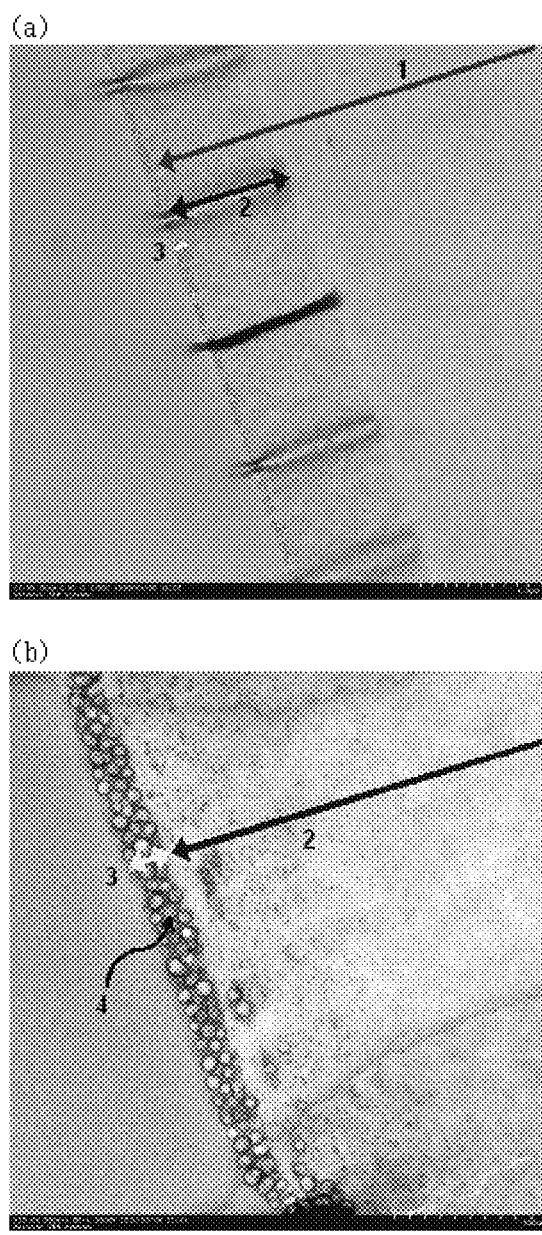

A cross-sectional image of the anti-reflective coating film is shown in FIG. 5(a), and a microscopic image of a part thereof is shown in FIG. 5(b). As shown in FIG. 5, the anti-reflective coating film according to Example 4 was found to have a hard coat layer 2 (approximately 2.78 μm) comprising a binder cured by infiltration into a substrate 1 and inorganic nanoparticles dispersed in the binder; a low refractive index layer 3 (approximately 0.18 μm) comprising a binder cured on the hard coat layer 2 and hollow particles 4 dispersed in the binder.

In addition, there was no separate layer between the hard coat layer 2 and the low refractive index layer 3, and a percentage of the cross-sectional area of the hollow particles 4 to any cross-sectional area of the low refractive index layer 3 was approximately 90%, indicating that hollow particles 4 were very compactly distributed in the low refractive index layer 3.

Comparative Example 1

Preparation of Anti-Reflective Coating Composition

Based on 100 parts by weight of pentaerythritol hexaacrylate (PETA);

15.87 parts by weight of silica nanoparticle-dispersed silica sol (dispersion medium: methyl isobutyl ketone and methyl alcohol, solid content: 40% by weight, number average diameter: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photoinitiator (specifically, approximately 1.11 parts by weight of Darocur-1173, approximately 6.48 parts by weight of Irgacure-184, approximately 2.15 parts by weight of Irgacure-819 and approximately 1.11 parts by weight of Irgacure-907); and approximately 251.85 parts by weight of a solvent (specifically, approximately 125.91 parts by weight of methyl isobutyl ketone, approximately 41.98 parts by weight of ethanol, approximately 41.98 parts by weight of n-butyl alcohol and approximately 41.98 parts by weight of acetyl acetone) were mixed to prepare an anti-reflective coating composition.

(Manufacturing of Anti-Reflective Coating Film)

An anti-reflective coating film was manufactured under the same conditions and in the same manner as in Example 1, except using the above anti-reflective coating composition. A cross-sectional image of the anti-reflective coating film is shown in FIG. 6(a), and a microscopic image of a part thereof is shown in FIG. 6(b).

Figure 6:
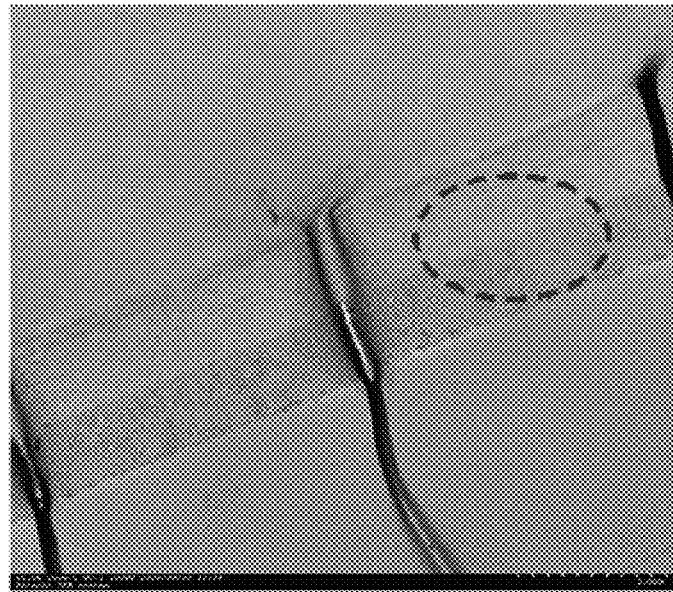
Figure 6:
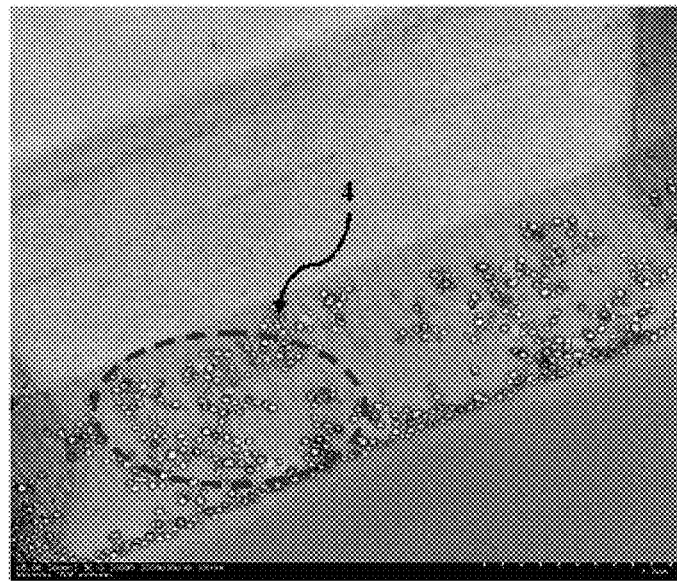

As shown in FIG. 6, in the anti-reflective coating film according to Comparative Example 1, phase separation of the composition did not occur properly (see the circle of FIG. 6(a)), and in particular, hollow particles 4 were very sparsely distributed in the low refractive index layer (see the circle of FIG. 6(b)). Thus, appearance of the film became opaque, and scratch resistance and anti-reflective effect were also reduced (see Experimental Example). In the anti-reflective coating film of Comparative Example 1, a percentage of the cross-sectional area of the hollow particles to any cross-sectional area in the entire area of the hollow particle-distributed region was found to be approximately 30~60%.

Experimental Example

The anti-reflective coating films manufactured by Examples and Comparative Example were evaluated for the following items, and the results are shown in the following Table 1.

1) Measurement of reflectance: the back side of the anti-reflective coating film was treated with black color, and then low reflection property was evaluated by minimum reflectance value. At this time, a Shimadzu Solid Spec. 3700 spectrophotometer was used for measurement.

2) Measurement of transmittance and haze: HR-100 (Murakami Co., Japan) was used to evaluate transmittance and haze.

3) Evaluation of scratch resistance: the anti-reflective coating film was rubbed using a steel wool with a load of 500 g/cm$^2$ at a speed of 24 m/min 10 times, and then the number of scratches having a length of 1 cm or longer was counted on the surface. At this time, when no scratch was found on the film surface, it was evaluated as "very excellent" (◎), and when the numbers of scratch having a length of 1 cm or longer were 1 or more to less than 5, 5 or more to less than 15, and 15 or more, each was evaluated as "excellent" (○), "moderate" (Δ), and "poor" (X), respectively.

4) Microscopic imaging of cross-section of film: the cross-section of each film prepared by microtoming was observed using a Transmission Electron Microscope (name: H-7650, manufactured by HITACHI).

5) Evaluation of adhesion: adhesion of each film was evaluated by a cross cut test (ASTM D-3359) using a Nichiban tape.

TABLE 1

| | Reflectance (%) | Transmittance (%) | Haze (%) | Scratch resistance | Adhesion |
|---|---|---|---|---|---|
| Example 1 | 1.2 | 95.8 | 0.3 | ○ | 5B |
| Example 2 | 1.2 | 95.8 | 0.2 | ◎ | 5B |
| Example 3 | 1.67 | 95.2 | 0.3 | ◎ | 5B |
| Example 4 | 1.30 | 95.5 | 0.3 | ◎ | 5B |
| Comparative Example 1 | 2.0 | 94.0 | 0.7 | Δ | 2B |

As shown in Table 1, the anti-reflective coating films according to Examples had lower reflectance and higher transmittance than the film of Comparative Example, and they exhibited excellent scratch resistance and adhesion.

The invention claimed is:

1. A method for manufacturing an anti-reflective coating film, comprising the steps of:
providing an anti-reflective coating composition comprising a binder composition comprising a first (meth)acrylate-based compound and a second (meth)acrylate-based compound having a higher molecular weight than the first (meth)acrylate-based compound, inorganic nanoparticles, hollow particles, an initiator, and a solvent;
applying the coating composition onto at least one surface of a substrate;
drying the coating composition applied to allow at least a part of the first (meth)acrylate-based compound and inorganic nanoparticles to infiltrate into the substrate; and
curing the composition to form a first layer that corresponds to the infiltrated region of the substrate, and a second layer comprising hollow particles, which covers the first layer,
wherein a percentage of the cross-sectional area of the hollow particles to any cross-sectional area of the second layer is 70 to 95%,
wherein the inorganic nanoparticles have a number average diameter of 5 to 50 nm,
wherein the hollow particles have a number average diameter of 5 to 80 nm,
wherein the refractive index of the second layer is 1.45 or less.

2. The method according to claim 1, wherein the anti-reflective coating composition comprises 5 to 30 parts by weight of the inorganic nanoparticles, 1 to 30 parts by weight of the hollow particles, 5 to 25 parts by weight of the initiator, and 100 to 500 parts by weight of the solvent, based on 100 parts by weight of the binder composition.

3. The method according to claim 1, wherein the first (meth)acrylate-based compound has a molecular weight of less than 600.

4. The method according to claim 1, wherein the second (meth)acrylate-based compound has a molecular weight of 600 to 100,000.

5. The method according to claim 1, wherein the binder composition comprises 5 to 30 parts by weight of the second (meth)acrylate-based compound, based on 100 parts by weight of the first (meth)acrylate-based compound.

6. The method according to claim 1, wherein the first (meth)acrylate-based compound is one or more compounds selected from the group consisting of pentaerythritol tri(meth)acrylate, pentaerythritol tetra(meth)acrylate, dipentaerythritol hexa(meth)acrylate, trimethylenepropane tri(meth)acrylate, ethylene glycol di(meth)acrylate, 9,9-bis[4-(2-acryloxyethoxy)phenyl]fluorene, bis(4-methacryloxythiophenyl)sulfide, and bis(4-vinylthiophenyl)sulfide.

7. The method according to claim 1, wherein the second (meth)acrylate-based compound comprises a compound having two or more molecules of the first (meth)acrylate-based compound linked via a linker.

8. The method according to claim 7, wherein the second (meth)acrylate-based compound comprises a compound having one or more substituents selected from the group consisting of an epoxy group, a hydroxyl group, a carboxyl group, a thiol group, an aromatic or aliphatic hydrocarbon group having 6 carbon atoms or more, and an isocyanate group.

9. The method according to claim 7, wherein the linker comprises a urethane bond, a thioether bond, an ether bond or an ester bond.

10. The method according to claim 1, wherein the binder composition further comprises a fluorine-based (meth)acrylate compound substituted with one or more fluorine atoms.

11. The method according to claim 10, wherein the fluorine-based (meth)acrylate compound comprises one or more compounds selected from the group consisting of the compounds of the following Chemical Formulae 1 to 5:

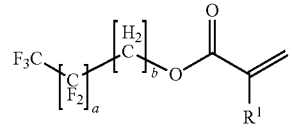

[Chemical Formula 1]

wherein $R^1$ is a hydrogen group or an alkyl group having 1 to 6 carbon atoms, a is an integer of 0 to 7, and b is an integer of 1 to 3;

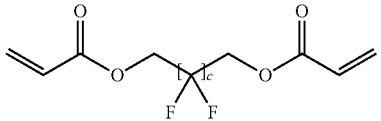

[Chemical Formula 2]

wherein c is an integer of 1 to 10;

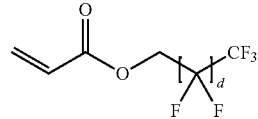

[Chemical Formula 3]

wherein d is an integer of 1 to 11;

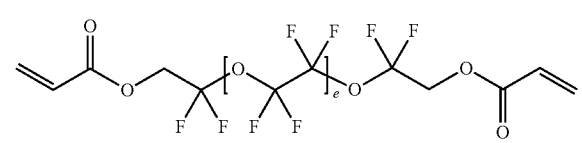

[Chemical Formula 4]

wherein e is an integer of 1 to 5;

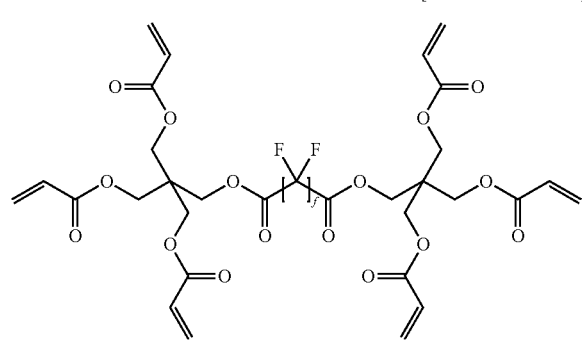

[Chemical Formula 5]

wherein f is an integer of 4 to 10.

12. The method according to claim 1, wherein the inorganic nanoparticles are silica nanoparticles.

13. The method according to claim 1, wherein the hollow particles are hollow silica particles.

14. The method according to claim 1, wherein the solvent has a dielectric constant (25° C.) of 20~30, and a dipole moment of 1.7~2.8.

15. The method according to claim 1, wherein the drying step is performed at a temperature of 5 to 150° C. for 0.1 to 60 minutes.

16. The method according to claim 1, wherein the curing step is performed at UV radiation of 0.1 to 2 J/cm$^2$ for 1 to 600 seconds.

* * * * *